(12) United States Patent
Park

(10) Patent No.: US 8,427,093 B2
(45) Date of Patent: Apr. 23, 2013

(54) CONTROLLER FOR ACTUATION SYSTEM EMPLOYING KALMAN ESTIMATOR INCORPORATING EFFECT OF SYSTEM STRUCTURAL STIFFNESS

(75) Inventor: Austin Park, Burbank, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 451 days.

(21) Appl. No.: 12/829,523

(22) Filed: Jul. 2, 2010

(65) Prior Publication Data

US 2012/0001582 A1 Jan. 5, 2012

(51) Int. Cl.
*G05B 11/42* (2006.01)

(52) U.S. Cl.
USPC .......................... 318/610; 318/611; 318/632

(58) Field of Classification Search .................. 318/610, 318/611, 632, 721, 636, 700, 798, 453
See application file for complete search history.

(56) References Cited

U.S. PATENT DOCUMENTS

| | | | |
|---|---|---|---|
| 5,058,836 A | 10/1991 | Nobel | |
| 6,564,110 B1 | 5/2003 | Makino et al. | |
| 6,565,110 B1 | 5/2003 | Makino et al. | |
| 7,276,877 B2 | 10/2007 | Qiu et al. | |
| 2010/0198527 A1* | 8/2010 | Gouriet et al. | 702/33 |

FOREIGN PATENT DOCUMENTS

| | | |
|---|---|---|
| EP | 1298053 A2 | 4/2003 |
| WO | 2007092466 A2 | 8/2007 |

* cited by examiner

*Primary Examiner* — Karen Masih
(74) *Attorney, Agent, or Firm* — BainwoodHuang

(57) ABSTRACT

A controller for an electro-mechanical actuation system (e.g., missile fin actuator) includes a Kalman estimator circuit generating an estimate of operating state including position and velocity of motor, position and velocity of a position-controlled element (PCE), and motor current. The estimate is generated based on a dynamic model explicitly including the effect of structural stiffness and damping in the coupling between the motor and PCE, for example by treating it as a mechanical oscillator having spring and damping constants. The Kalman estimator operates on a motor drive control signal and a measured position signal which may be from a Hall sensor sensing motor position. A linear quadratic regulator circuit applies a state feedback gain matrix to a state vector to generate a control effort signal. The state feedback gain matrix minimizes a quadratic cost function representing variance of the control effort signal and/or the measured position signal.

16 Claims, 3 Drawing Sheets

CONTROLLER FOR ACTUATION SYSTEM EMPLOYING KALMAN ESTIMATOR INCORPORATING EFFECT OF SYSTEM STRUCTURAL STIFFNESS

BACKGROUND

The present invention is related to the field of actuators for position-controlled elements such as flight surfaces of an airborne vehicle.

Electro-mechanical actuators are generally known which provide mechanical power to establish and maintain the position of a position-controlled element (PCE), which may include fins, flaps and other flight surfaces of missiles or other airborne vehicles. The mechanical power is generated by a motor and coupled to the PCE via a mechanical drive linkage. Operation of such an actuator is typically controlled by a control circuit or unit (generally "controller") which is responsible for accurate positioning of the PCE responsive to an input positioning command signal from some other element of the system. In an airborne vehicle, for example, the positioning command signal may be from a navigation controller which is responsible for moving the airborne vehicle along a desired flight path, and it may represent an angle value which is the desired angular position of the PCE.

One general class of controller for electro-mechanical actuators is the so-called proportional-integral-derivative or PID type of controller. A PID controller may receive a motor position feedback signal from a Hall-effect sensor or other position sensor, and it may use the position feedback signal in a conventional manner to position the PCE as commanded by a position command signal, based on an assumed known relationship between the motor position and the position of the PCE.

U.S. Pat. No. 7,276,877 of Qiu et al. shows a controller for a motor drive system of a type commonly used in aerospace and industrial applications. A state observer control system for the motor uses an extended Kalman filter to predict initial rotor position and afterwards accurately predict rotor position and/or speed under variable types of loading conditions. A control system model is generated that allows variable setting of an initial rotor position to generate estimated rotor position and speed as outputs. The control system model includes an EKF (extended Kalman filter) estimator, speed controller, a current controller, and a variable load component. During operation, EKF estimator estimates rotor speed and position based on reference voltages and currents generated by speed and current controllers and input from frame transformers. Additionally, the reference currents and voltages are frame-transformed to be used as feedback signals in the system and as drive signals to control power to be applied to a motor load.

U.S. Pat. No. 6,564,110 of Makino et al. shows a motor-drive controller including a discrete Kalman filter and a disturbance estimating unit added to a feedback loop for feeding back a detected value of position from a position detector. The Kalman filter estimates position and velocity of an object to be controlled, thereafter outputting an estimated value of position and an estimated value of velocity. The disturbance estimating unit estimates the current value of the disturbance that is applied to an object from a command value of current and the estimated value of velocity. The estimated value of position is fed back to a position controller, and the estimated value of velocity is fed back to a velocity controller. Further, a difference between a target value of current outputted from the velocity controller and the estimated value of disturbance is output as the command value of current.

SUMMARY

One of the challenges in actuator systems can be a combination of low mechanical stiffness of the drive linkage and limited position feedback information from the system. For example, in many applications a PID controller is employed and the only feedback is from a Hall sensor or similar sensor providing position information about the rotational position of the motor. If the drive linkage and position-controlled element (PCE) are sufficiently rigid, the motor position signal may represent the position of the PCE sufficiently accurately. However, in applications having lower stiffness (which may be lower-cost applications for example), there may be significant instantaneous differences between the motor position and the effective position of the PCE, undesirably limiting the responsiveness and accuracy of the actuation system in such a conventional controller is employed.

The present disclosure is directed to a controller for use as part of an actuation system which includes a motor mechanically coupled to a position-controlled element (PCE). Example applications include actuation of fins or canards on an airborne vehicle such as a missile. The controller may be especially useful when the system stiffness is low compared to the magnitude of the loads encountered by the PCE in operation.

The disclosed controller includes forward circuitry which generates a motor drive control signal as a function of a sum of a converted position command input signal, a linear quadric (LQ) state feedback signal, and an integrated signal. The motor drive control signal controls a level of power supplied to the motor to cause corresponding motion of the PCE. The position command input signal may be from a higher-level controller such as a navigation controller in a flight application, etc.

The controller also includes feedback circuitry which generates the control effort signal, i.e., the LQ state feedback signal, as a function of a control output signal (from which the motor drive control signal is derived) and a measured position signal which conveys position information regarding measured position of either the motor or the PCE. The feedback circuitry includes a Kalman estimator circuit and a linear quadratic regulator (LQR) circuit which co-operate to generate the control effort signal used by the forward circuitry. The feedback circuitry may also include a discrete integration circuit between the command and measured feedback signals for steady-state control.

The Kalman estimator circuit continually generates a state vector representing an estimate of an operating state of the actuation system, wherein the operating state includes position and velocity of the motor, position and velocity of the PCE, and motor current. The state vector is generated based on a dynamic model which explicitly includes effects of structural stiffness and damping between the motor and the PCE. For example, the mechanical coupling may be modeled as a mechanical oscillator having a spring constant and a damping constant. The Kalman estimator circuit includes (1) a predictor circuit which generates a predicted next state based on the state estimate and the motor drive control signal, and (2) an update circuit which updates the state estimate based on the predicted next state and the measured position signal.

The LQR circuit generates the control effort signal by applying a state feedback gain matrix to the state vector. The state feedback gain matrix minimizes a quadratic cost function representing variance of the control effort signal and/or the measured position signal.

The disclosed controller can provide improved dynamic performance of an actuation system by its use of the Kalman state estimator to estimate position of the PCE based on only a motor position signal, for example. The inclusion of information regarding the structural stiffness and damping of the system in the Kalman estimator can compensate for the dynamic effect of the mechanical elements (such as drive linkage—e.g., gear train) of the actuation system, improving control accuracy even under conditions of high dynamic loading.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
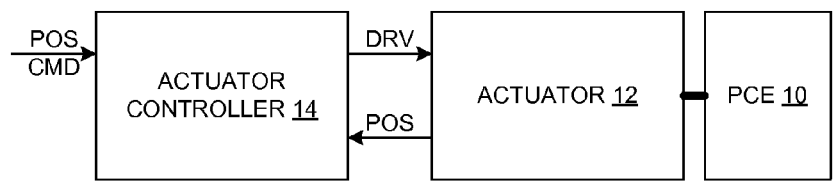
FIG. 1 is a block diagram of an actuation system.

FIG. 1 shows an actuation system having a position-controlled element (PCE) 10 whose position is to be controlled responsive to a position command signal POS CMD from an external controller not shown in FIG. 1. The actuation system includes an actuator 12 and an actuator controller 14, for which details are described below. As mentioned above, the actuation system may be any of a variety of types for any of a variety of purposes. The present description will refer to one specific use which is for flight control of a missile or similar airborne vehicle. In this example use, the PCE 10 may be a fin or canard which interacts with the surrounding air to impart steering forces to the missile, and whose position is controlled by a navigation controller responsible for guiding the missile along a flight path. In this example, such a navigation controller generates the position command signal POS CMD to command the fin/canard to a desired position for navigation purposes, and the actuator 12 and actuator controller 14 are responsible for physically moving the fin/canard to the commanded position and maintaining it there.

Also shown in FIG. 1 are an actuator drive control signal DRV and a measured position signal POS. DRV is generated by the actuator controller 14 and supplied to the actuator 12 to effect desired movement. For example, DRV may be in the form of a pulse width modulation (PWM) control signal controlling the amount of electrical power supplied to windings of a motor within the actuator 12, creating a mechanical force from the motor which moves the PCE 10. POS provides information regarding an actual measured position of the actuator 12 and/or PCE 10. For example, POS may be generated by Hall-effect sensors adjacent to a motor within the actuator 12 for sensing motor position based on the pattern of a magnetic field from the motor. As described in more detail below, POS need not convey actual measured position of the PCE 10, yet the actuator controller 14 can accurately control the position of the PCE 10 based on other (potentially quite limited) information about the state of the actuation system.

Figure 2:
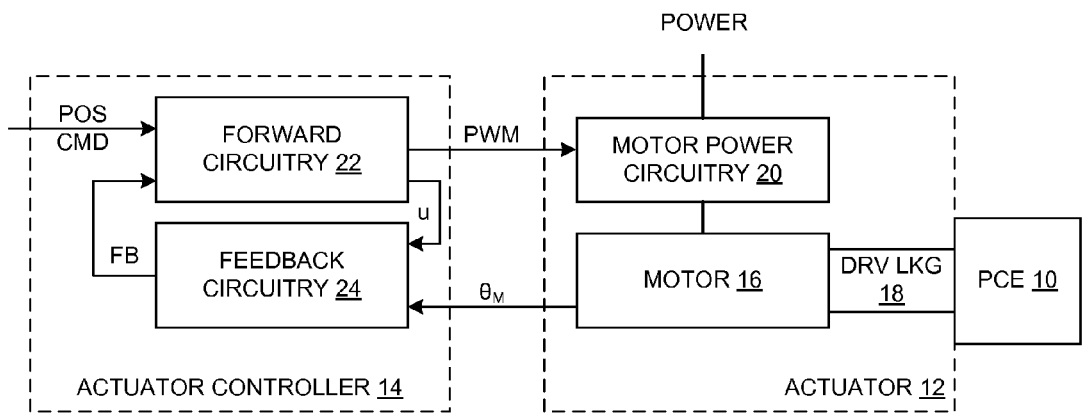
FIG. 2 is a block diagram of an actuation system.

FIG. 2 shows the actuation system in greater detail. The actuator 12 includes a motor 16, drive linkage (DRV LKG) 18 which can include a certain type of gear train, and motor power circuitry 20. The motor 16 may be any of several types suitable for maintaining a position against an applied force experienced by the PCE 10. In one example, the motor is a rotary motor having a stationary stator and a rotating rotor to which the drive linkage 18 is mechanically coupled. Rotational motion of the rotor results in corresponding motion of the PCE 10, which may be rotational, linear or of some other type depending on the nature of the drive linkage 18. In an example of a missile, rotation of the rotor of the motor 16 may cause pivoting of a fin or canard which constitutes the PCE 10.

The drive linkage 18 mechanically couples the motor 16 to the PCE 10. This may be as simple as an extension of the rotor shaft of the motor with direct attachment to the PCE 10, or a more involved linkage employing any of gears, cams, cranks, chains or belts, drive screws, etc. The motor power circuitry 20 controls the application of electrical power to the motor 16 responsive to a drive control signal from the actuator controller 14. In the illustrated embodiment, the drive control signal is a pulse width modulation control signal PWM that controls the duty cycle of switching circuitry within the motor power circuitry 20 providing winding current to the motor 16, a technique generally known in the art. The PWM signal corresponds to the DRV signal in FIG. 1. Also shown in FIG. 2 is a control output signal u from which the PWM signal is derived as described below.

The actuator controller 14 includes forward circuitry 22 and feedback circuitry 24. As will be appreciated in the description below, these are somewhat arbitrary labels used herein for ease of referring to corresponding portions of control circuitry. Nonetheless, the labels generally correspond to the functions of (1) generating output signals u and PWM in part based on the input signal POS CMD, and (2) generating a feedback signal FB which is provided to the forward circuitry 22 to affect the value of PWM in a desired manner based on the operating condition of the actuator 12. In the illustrated embodiment, the feedback circuitry 24 operates on the control output signal u as well as a motor position input signal $\theta_M$ conveying information regarding the actual position (e.g., rotational position) of the motor 16. The $\theta_M$ signal corresponds to the POS signal in FIG. 1. As mentioned above, it may be generated by Hall sensors or other position detectors operatively coupled to the motor 16.

It should also be noted that the labeling of actuator 12 is also for ease of description herein. In many embodiments the motor power control circuitry 20 may not be physically included in an actuator assembly or sub-system which includes the motor 16 and drive linkage 18, and in fact in some embodiments it may be packaged with some or all of the circuitry which corresponds to the actuator controller 14.

Figure 3:
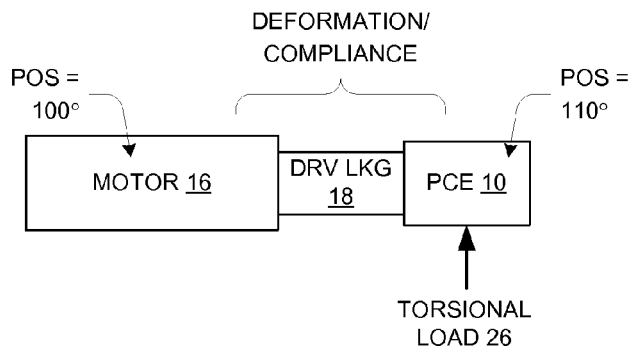
FIG. 3 is a block diagram of a motor coupled to a position-controlled element.

FIG. 3 illustrates one particular aspect of the actuation system which is addressed in operation, as described in detail below. The mechanical coupling between the motor 16 and PCE 10 is not perfectly rigid, and thus there is not always an exact known correspondence between the position of the motor 16 and the position of the PCE 10. During operation under dynamic forces, the relationship between the respective positions of the motor 16 and PCE 10 may vary considerably, and the overall mechanical path between the motor 16 and applied force (including drive linkage 18) supplies corresponding mechanical compliance.

In a simple example, the motor 16 is commanded to a position of 100°, and it is assumed that sufficient winding current is instantaneously available to maintain the commanded motor position even in the presence of a large load. Further, in the absence of a load on the PCE 10 it would assume a corresponding position of 100°. In the presence of a load 26 applied to the PCE 10, the PCE 10 and/or drive linkage 18 undergo some amount of deflection or deformation depending on their mechanical properties. In the example of a fin serving as the PCE 10 and a drive shaft serving as the drive linkage 18, the fin may bend or otherwise deform slightly from its unloaded shape, and the drive shaft may twist or otherwise deform slightly from its unloaded shape. In the simple example of FIG. 3, the effective instantaneous position of the PCE 10 may be 110° for example. Both the magnitude and dynamic (time-varying) behavior of such positional differences between the motor 16 and PCE 10 can be affected by a variety of primarily mechanical factors which are specific to any particular embodiment. This effect can be modeled, perhaps using only a small number of parameters. For example, it can be modeled as a mechanical oscillator having a spring constant and a damping coefficient. As described below, these parameters can be incorporated into a larger model of system operation so that the effect is included in the generating of the drive control signal PWM, thereby achieving more accurate positioning of the PCE 10 in the presence of large dynamic loads.

Figure 4:
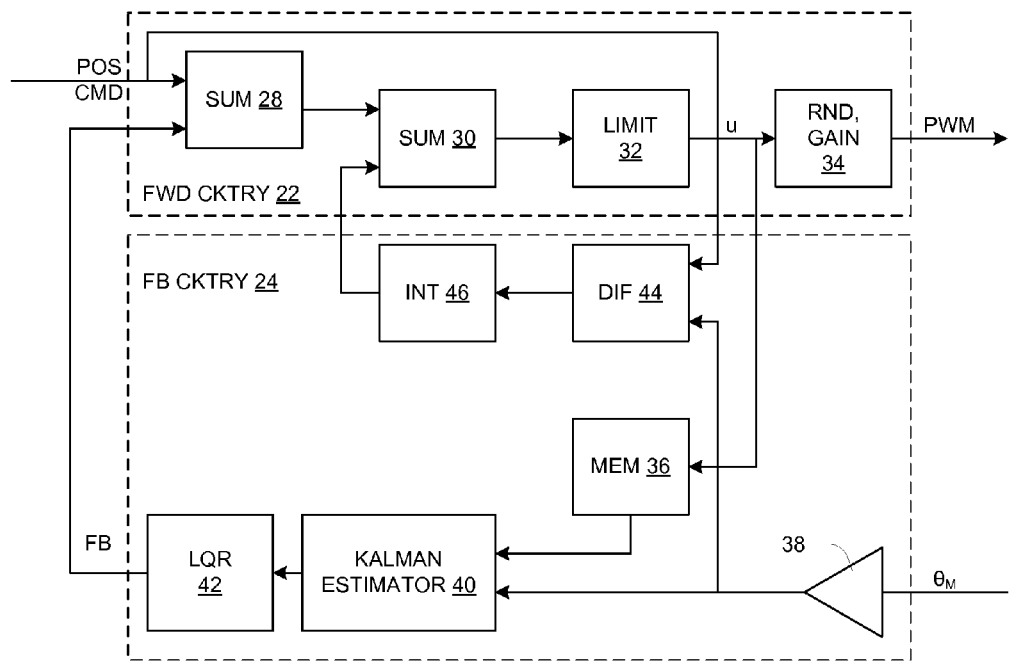
FIG. 4 is a schematic block diagram of an actuator controller.

FIG. 4 illustrates the actuator controller 14 in more detail. The forward circuitry 22 includes two summing circuits (SUM) 28, 30, a limit circuit 32 and a rounding and gain circuit (RND, GAIN) 34. The feedback circuitry 24 includes components on two distinct functional paths. A main feedback path includes a memory 36, amplifier 38, Kalman estimator 40 and linear quadratic regulator (LQR) circuit 42. A second feedback path includes a difference circuit (DIF) 44 and an integrator (INT) 46. The purpose and effect of the second feedback path is to provide for relatively long-period tracking (quasi steady state) between the POS CMD signal and the motor position as conveyed by $\theta_M$. The structure and operation of the second feedback circuitry is of a conventional proportional-integral-derivative (PID) nature and not described further herein. The purpose and effect of the main feedback path is to provide for accurate dynamic control of the position of the PCE 10 in response to the POS CMD signal. This is achieved by operation of the Kalman estimator 40 and LQR circuit 42 as described more fully below.

In the illustrated embodiment, the Kalman estimator 40 operates in accordance with a model of the actuation system which is based on certain dynamic equations of motion that describe relationships among five state variables as follows:
1. Position of motor 16, represented by variable $\theta_M$
2. Velocity of motor 16, represented by variable $\dot{\theta}_M$
3. Position of PCE 10, represented by variable $\theta_F$
4. Position of PCE 10, represented by variable $\dot{\theta}_F$
5. Current of motor 16, represented by variable $i_M$ A full description of the model is given below, along with a so-called "state space equation formulation" of the model which is used to specify the structure and function of the Kalman estimator 40 and LQR 42.

It will be observed that the symbol $\theta_M$ is used for both the motor-position state variable as well as the physical signal conveying actual position of the motor 16. The actual value being referenced by each use herein should be clear in context.

The LQR circuit 42 performs a single matrix multiplication of a state vector from the Kalman estimator 40 to create the scalar FB signal, as described more fully below. The matrix is a matrix of pre-calculated constants referred to as a "state feedback gain" matrix. Circuit and/or firmware techniques for performing matrix multiplications of this type are generally known and thus not described further herein.

Figure 5:
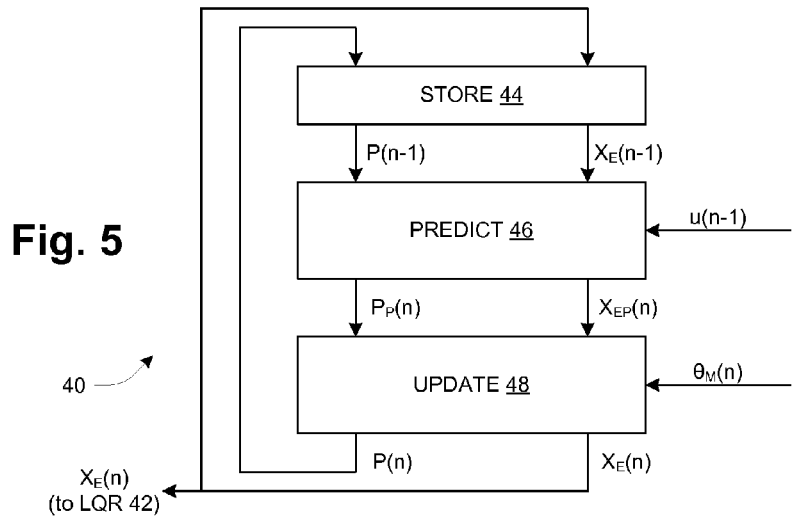
FIG. 5 is a schematic block diagram of a Kalman estimator.

FIG. 5 shows the general structure of the Kalman estimator 40. The description herein assumes a discrete-time realization in which operation is divided into fixed-size sample periods, although in alternative embodiments a continuous-time realization may be employed. The Kalman estimator 40 includes a memory or store 44, a predictor circuit (PREDICT) 46 and an update circuit (UPDATE) 48. In operation, the most recently calculated values of a state vector $X_E$ (shown as $X_E(n-1)$) and an estimate error covariance P (shown as P(n-1)) are stored in the store 44. The estimate error covariance P reflects a measure of the estimated accuracy of the state vector $X_E$ (i.e., how closely it represents the actual operating state of the actuator 12 and PCE 10). During each sample period, the predictor circuit 46 uses P(n-1) and $X_E(n-1)$, along with the most recent value of the control output signal (shown as u(n-1), obtained from the memory 36 of FIG. 4) to calculate predicted present values for both P and $X_E$, shown as $P_P(n)$ and $X_{EP}(n)$. The update circuit 48 uses $P_P(n)$ and $X_{EP}(n)$, along with the present value of the motor position signal $\theta_M(n)$ to calculate updated present values for both P and $X_E$, shown as P(n) and $X_E(n)$. $X_E(n)$ is the present state vector and is provided to the LQR circuit 42 to generate the FB signal (FIG. 4). Additionally, both P(n) and $X_E(n)$ are stored in the store 44 for use during the next sample period.

The exact structures of the predictor circuit 46 and update circuit 48 may vary in different embodiments and are not described in detail herein. Those skilled in the art will readily understand how they can be realized using conventional circuit/firmware techniques based on the functional and mathematical description herein. In this respect it is noted that there are existing design tools suitable for generating representations of these components from a state-space equation formulation of the dynamic behavior of the actuation system, such as described below.

Figure 6:
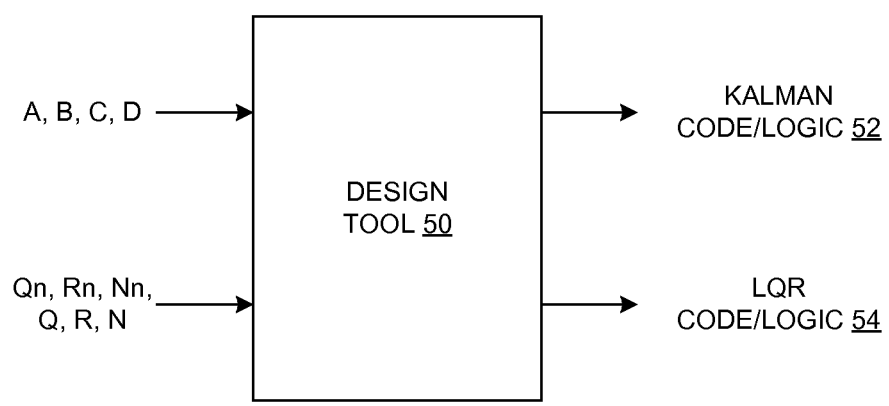
FIG. 6 is a block diagram showing use of a design tool to generate code/logic for a Kalman estimator and linear quadratic regulator.

FIG. 6 provides a general illustration of the use of such a design tool. In this example, a design tool 50 receives as input various matrices A, B, C, D, Qn, Rn, Nn, Q, R and N as shown, and in operation it generates Kalman code/logic 52 and LQR code/logic 54. The nature of the input matrices is described below. In the event that the Kalman estimator 40 and LQR 42 are realized in firmware or programmable logic (i.e., field-programmable gate arrays etc.), the sets of code/logic 52, 54 may be directly usable to realize these functional blocks. Alternatively, the sets of code/logic 52, 54 may serve as input to another design step in which the code/logic 52, 54 are translated into corresponding firmware or hardware logic which realizes the Kalman estimator 40 and LQR circuitry 42 according to generally known techniques. One example of the design tool 50 is a suite of tools known as MATLAB® sold by MathWorks, Inc. MATLAB includes both a kalman( ) function as well as a lqry( ) function which can generate software implementing the functions of the Kalman estimator 40 and LQR circuit 42 based on a state-space description of the actuation system, such as described more fully below.

It is observed at this point that the Kalman estimator 40 maintains a state vector $X_E$ including five state variables, but the update circuit 48 uses only the one measured value $\theta_M$ from the actuator system. This ability to accurately model a system using only limited measured information from the system is one of the hallmarks of Kalman estimation. This feature is especially significant in the present case in which it is desired to accurately control the position of the PCE 10 (represented by the variable $\theta_F$) while having only the measured motor position $\theta_M$. Many actuation systems employ this general structure, utilizing measured information from a motor or other actuator component instead of the actual PCE 10 (e.g. fin) whose position is being controlled. In many cases it is assumed that the coupling between the point of measurement and the PCE 10 is perfectly rigid, and the operation resulting from this assumption may be acceptable for many applications. However, the presently disclosed technique can provide increased accuracy even with non-ideal rigidity of the coupling. Thus, the technique may be especially useful in applications having relatively low mechanical stiffness compared to the loads that are regularly encountered.

The Appendix below provides a detailed description including an equation-based dynamic model for the actuation system, a corresponding state-space description in which examples of the matrices A, B, C, D, Qn, Rn, Nn, Q, R and N are given, and the manner in which these are provided to a design tool such as MATLAB to generate the Kalman estimator 40 and LQR circuitry 42. The Appendix also describes a quadratic cost function J which is minimized by a state feedback gain matrix K_d which can be calculated using the MATLAB lqry( ) function and then implemented by the LQR circuitry 42. The system model employs three dynamic equations of motion expressing relationships among various system variables and constants. As mentioned above, the model includes modeling of the mechanical coupling between the motor 16 and PCE 10 as a mechanical oscillator, in the form of a system torsional structural stiffness K and a system torsional damping coefficient B. Appropriate values for the constants and ranges for the variables will generally vary among different embodiments in accordance with the nature of the motor 16 and mechanical components of the system, and suitable values and ranges can be arrived at by those skilled in the art based on known analysis and/or measurement techniques (including simulations).

For ease of understanding, the following additional notes regarding the description in the Appendix below are also provided:

1. The estimated state of the system is represented by state vector 'x' ($<x_1, x_2, x_3, x_4, x_5>$)

2. The system output (motor position $\theta_M$) is referred to as an output 'y'

3. The system input is referred to as a control effort 'u'

4. The matrices A, B, C, and D are sometimes referred to as the state transition matrix, input matrix, output matrix, and feed-forward matrix respectively. The Qn, Rn, and Nn matrices represent variance/covariance data for control input noise and output noise as generally known, and the Q, R, and N are weighting matrices to determine the state feedback gain matrix K_d.

The Appendix also includes an analysis which establishes that the system is both controllable and observable, and thus capable of realization and stable in operation.

While various embodiments of the invention have been particularly shown and described, it will be understood by those skilled in the art that various changes in form and details may be made therein without departing from the spirit and scope of the invention as defined by the appended claims.

For example, the actuation system may be used in any of a variety of applications other than missile flight controls, including robotically controlled arms/manipulators etc. Systems using linear or other actuation geometries rather than the rotary actuation described above are also contemplated. Additionally, while in the above description the features of the Kalman estimator 40 and LQR 42 are pre-calculated and constant, in alternative embodiments it may be desirable to use some degree of adaptiveness to alter the characteristics of these elements over time, for example to take into the account the effects of wear or modification or simply to permit use of mechanical components with wider tolerances.

APPENDIX-Mathematical Description of System Model, Kalman Estimator and LQR

Three $2^{nd}$ order dynamic equations of motion are derived and then, a state space equation with five state variables is formulated.

Dynamic equations of motion for the missile CAS:

$$J_m \ddot{\theta}_m = K_T i_m - \frac{K}{GR \cdot \varepsilon}\left(\frac{\theta_m}{\varepsilon} - \theta_f\right) - \frac{B}{GR \cdot \varepsilon}\left(\frac{\dot{\theta}_m}{GR} - \dot{\theta}_f\right) - b_m \dot{\theta}_m$$

$$J_L \ddot{\theta}_f = T_{LC} + T_L \theta_f - K\left(\theta_f - \frac{\theta_m}{GR}\right) - B\left(\dot{\theta}_f - \frac{\dot{\theta}_m}{GR}\right)$$

$$L_m \frac{di}{dt} + R_m i_m = V_{sup} \cdot u^* \cdot G - K_b \cdot \dot{\theta}_m$$

where
- $J_m$: mass moment of inertia of motor (in-lb$_f$-s$^2$)
- $\theta_m$: motor shaft angular position (radian)
- $K_T$: motor torque constant (in-lb$_f$/Amps)
- $i_m$: motor current (Amps)
- $b_m$: motor viscous damping coefficient (in-lb$_f$-s/rad)
- $K_b$: motor back-emf constant (V-s/rad)
- $R_m$: motor resistance including wire and sensing resistance (Ohm)
- $L_m$: motor inductance (Henry)
- $V_{sup}$: motor supply voltage (Volt)
- u*: control effort
- G: PWM gain (1/127)
- $J_L$: mass moment of inertia of load except motor (in-lb$_f$-s$^2$)
- $\theta_f$: fin shaft angular position (radian)
- K: system torsional structural stiffness (in-lb$_f$/rad)
- B: system torsional structural damping coefficient (in-lb$_f$-s/rad)
- GR: drive train gear ratio
- $\varepsilon$: transmission efficiency
- $T_{LC}$: constant flight load (in-lb$_f$)
- $T_L$: rate of flight load as a function of fin shaft angular position (in-lb$_f$/deg)

The constant flight load, $T_{LC}$ is ignored in the derivation of state space equation.

State space equation formulation:

$$\dot{x} = Ax + Bu$$

$$y = Cx + Du$$

$$x = [x_1, x_2, x_3, x_4, x_5]^T$$

$$u = [u^*]$$

where $x_1 = \theta_m, x_2 = \dot{\theta}_m, x_3 = \theta_f, x_4 = \dot{\theta}_f, x_5 = i_m$ $$A = \begin{bmatrix} 0 & 1 & 0 & 0 & 0 \\ -\frac{K}{GR^2\varepsilon J_m} & -\left(\frac{B}{GR^2\varepsilon J_m} + \frac{b_m}{J_m}\right) & \frac{K}{GR\varepsilon J_m} & \frac{B}{GR\varepsilon J_m} & \frac{K_T}{J_m} \\ 0 & 0 & 0 & 1 & 0 \\ \frac{K}{GRJ_L} & \frac{B}{GRJ_L} & \frac{T_L - K}{J_L} & -\frac{B}{J_L} & 0 \\ 0 & -\frac{K_b}{L_m} & 0 & 0 & -\frac{R_m}{L_m} \end{bmatrix}$$

$$B = \begin{bmatrix} 0 & 0 & 0 & 0 & \frac{V_{sup}G}{L_m} \end{bmatrix}^T$$

$$C = [1\ 0\ 0\ 0\ 0]^T,$$

$$D = [0]$$

System controllability and observability:

The system controllability and observability are examined by checking ranks of controllability and observability grammian matrices.

Dynamic motions of most control actuation systems (CASs) are considered that they can be well described as time invariant systems.

For the time invariant systems the condition for controllability is:

$$\text{rank}[C(A,B)] = n,$$

Here n is the matrix dimension.

C(A,B) is the controllability grammian matrix.

For the time invariant systems the condition for observability is:

$$\text{rank}[O(A,C)] = n,$$

Here n is the matrix dimension.

O(A,C) is the observability grammian matrix.

The following MATLAB commands give the ranks of the controllability and observability grammian matrices.

$$\text{rank}(Co(A,B)) = 5$$

$$\text{rank}(Ob(A,B)) = 5$$

Thus, the system described by the state space equation is both controllable and observable.

Conversion of continuous time system to a corresponding discrete time system of a sampling time Ts:

The continuous time state space equation is converted to a corresponding discrete time state space equation with a zero-order-hold and a sampling time Ts, using the following MATLAB command.

$$sys\_d = c2d(sys\_c, Ts, 'zoh')$$

where sys_c is the continuous time system; sys_d the corresponding discrete time system of the sampling time Ts.

Design of the discrete Kalman filter:

Separate control input u* and disturbance input d to obtain the augmented discrete state equation using the following MATLAB command.

$$Psys\_d = sys\_d(:,[1,1]);$$

Then, the discrete state space equation Psys_d has the following expression:

$$x[n+1] = Ax[n] + Bu[n] + Bd[n]$$

$$y[n] = Cx[n] + Du[n] + Hd[n] + v[n]$$

where d[n] is BLDC motor control input disturbance; v[n] motor hall state or magnetic encoder white noise.

The disturbance and noise covariance data is:

$$E(d[n]d[n]^T) = Qn,\ E(v[n]v[n]^T) = Rn,\ E(d[n]v[n]^T) = Nn$$

Based on the augmented discrete state equation Psys_d, the discrete Kalman filter is designed using the MATLAB command, kalman.

$$Kalman\_d = kalman(Psys\_d, Qn, Rn, Nn)$$

The Kalman filter estimator takes the following state equation.

$$x_e[n+1] = A_e x_e[n] + B_e u[n]$$

$$y_e[n] = C_e x_e[n] + D_e u[n]$$

$$u[n] = [u^*, y]$$

Here, $x_e$ is the state vector that consists of five estimated state variables; $y_e$ the estimated outputs.

Design of a linear quadratic (LQ) state feedback gain matrix:

The LQ state feedback gain matrix minimizes the quadratic cost function J with appropriate weighting matrices Q, R, and N.

$$J = \int_0^\infty (y^T Q y + u^T R u + 2 y^T N u) dt$$

To calculate the discrete LQ state feedback gain matrix that minimizes the cost function J, $$K\_d = lqry(sys\_d, Q, R, N)$$

Here the Q, R, and N are weighting matrices of 1×1 and the N is often omitted. Thus, the Q and R are the only weighting factors.

The feedback gain K_d is a row vector of 1×5 and is multiplied to the estimated state variable vector $x_e$ to obtain the control effort u*.

$$u^* = -K\_d \times x_e[n]$$

What is claimed is:

1. A controller for use as part of an actuation system including a motor mechanically coupled to a position-controlled element, comprising:

forward circuitry operative to generate a motor drive control signal as a function of a sum of a position command input signal and a control effort signal, the motor drive control signal controlling a level of power supplied to the motor to cause corresponding motion of the position-controlled element; and feedback circuitry operative to generate the control effort signal as a function of the motor drive control signal and a measured position signal conveying position information regarding measured position of at least one of the motor and the position-controlled element, the feedback circuitry including:

a Kalman estimator circuit operative to continually generate a state vector representing an estimate of an operating state of the actuation system, the operating state including position and velocity of the motor, position and velocity of the position-controlled element, and current of the motor, the state vector being generated based on a dynamic model which explicitly includes effects of structural stiffness and damping between the motor and the position-controlled element, the Kalman estimator circuit including (1) a predictor circuit generating a predicted next state based on the state vector and the a control output signal from which the motor drive control signal is derived, and (2) an update circuit updating the state vector based on the predicted next state and the measured position signal; and a linear quadratic regulator circuit operative to generate the control effort signal by applying a state feedback gain matrix to the state vector, the state feedback gain matrix having a value which minimizes a quadratic cost function representing variance of the control effort signal and/or the measured position signal.

2. A controller according to claim 1, wherein the motor is a rotary motor and the position-controlled element moves in a pivoting manner, and wherein the structural stiffness and damping included in the dynamic model include torsional stiffness and damping of the mechanical coupling between the motor and position-controlled element.

3. A controller according to claim 2, wherein the position-controlled element is a flight surface of an airborne vehicle and the dynamic model includes a variable representing aerodynamic load on the flight surface.

4. A controller according to claim 3, wherein the flight surface is a fin or canard which pivots to effect steering of the airborne vehicle.

5. A controller according to claim 1, wherein the operating state as estimated by the Kalman estimator circuit is represented by a set of state variables representing a motor position, a motor velocity, a position-controlled element position, a position-controlled element velocity, and a winding current of the motor, and wherein the measured position signal conveys position information regarding measured position of the motor and not regarding position of the position-controlled element.

6. A controller according to claim 1, wherein the dynamic model includes two equations representing force relationships among the motor, position-controlled element and a load experienced by the position-controlled element, and a third equation representing electro-mechanical behavior of the motor, and wherein the Kalman estimator circuit and linear quadratic regulator circuit are configured in accordance with a state-space description of the dynamic model including a state transition matrix and a noise variance matrix.

7. A controller according to claim 1, wherein the linear quadratic regulator circuit provides state feedback gain matrix to minimize a cost function based on variance of the position command input signal and the measured position signal.

8. A controller according to claim 1, wherein the feedback circuitry further includes second path circuitry providing proportional-integral-derivative feedback to achieve low-frequency tracking between the position command input signal and position of the motor.

9. A method for control of actuation system including a motor mechanically coupled to a position-controlled element, comprising:

generating a motor drive control signal as a function of a sum of a position command input signal and a control effort signal, the motor drive control signal controlling a level of power supplied to the motor to cause corresponding motion of the position-controlled element; and generating the control effort signal as a function of the motor drive control signal and a measured position signal conveying position information regarding measured position of at least one of the motor and the position-controlled element, the generating of the control effort signal including:

employing a Kalman estimator to continually generate a state vector representing an estimate of an operating state of the actuation system, the operating state including position and velocity of the motor, position and velocity of the position-controlled element, and current of the motor, the state vector being generated based on a dynamic model which explicitly includes effects of structural stiffness and damping between the motor and the position-controlled element, the Kalman estimator including (1) a predictor generating a predicted next state based on the state vector and a control output signal from which the motor drive control signal is derived, and (2) an updater updating the state vector based on the predicted next state and the measured position signal; and employing a linear quadratic regulator element to generate the control effort signal by applying a state feedback gain matrix to the state vector, the state feedback gain matrix having a value which minimizes a quadratic cost function representing variance of the control effort signal and/or the measured position signal.

10. A method according to claim 9, wherein the motor is a rotary motor and the position-controlled element moves in a pivoting manner, and wherein the structural stiffness and damping included in the dynamic model include torsional stiffness and damping of the mechanical coupling between the motor and position-controlled element.

11. A method according to claim 10, wherein the position-controlled element is a flight surface of an airborne vehicle and the dynamic model includes a variable representing aerodynamic load on the flight surface.

12. A method according to claim 11, wherein the flight surface is a fin or canard which pivots to effect steering of the airborne vehicle.

13. A method according to claim 9, wherein the operating state as estimated by the Kalman estimator is represented by a set of state variables representing a motor position, a motor velocity, a position-controlled element position, a position-controlled element velocity, and a winding current of the motor, and wherein the measured position signal conveys position information regarding measured position of the motor and not regarding position of the position-controlled element.

14. A method according to claim 9, wherein the dynamic model includes two equations representing force relationships among the motor, position-controlled element and a load experienced by the position-controlled element, and a third equation representing electro-mechanical behavior of the motor, and wherein the Kalman estimator and linear quadratic regulator element are configured in accordance with a state-space description of the dynamic model including a state transition matrix and a noise variance matrix.

15. A method according to claim 9, wherein the linear quadratic regulator element provides state feedback gain matrix to minimize a cost function based on variance of the position command input signal and the measured position signal.

16. A method according to claim 9, further including providing proportional-integral-derivative feedback to achieve low-frequency tracking between the position command input signal and position of the motor.

* * * * *